United States Patent
Peringassery Krishnan et al.

(10) Patent No.: US 12,532,014 B2
(45) Date of Patent: Jan. 20, 2026

(54) CONTEXT DERIVATION FOR ARITHMETIC CODING OF TRANSFORM COEFFICIENTS GENERATED BY NON-SEPARABLE TRANSFORMS

(71) Applicant: Tencent America LLC, Palo Alto, CA (US)

(72) Inventors: Madhu Peringassery Krishnan, Palo Alto, CA (US); Xin Zhao, San Jose, CA (US); Roman Chernyak, Santa Clara, CA (US); Shan Liu, San Jose, CA (US); Lien-Fei Chen, Hsinchu (TW)

(73) Assignee: TENCENT AMERICA LLC, Palo Alto, CA (US)

( * ) Notice: Subject to any disclaimer, the term of this patent is extended or adjusted under 35 U.S.C. 154(b) by 6 days.

(21) Appl. No.: 18/620,945

(22) Filed: Mar. 28, 2024

(65) Prior Publication Data
US 2024/0357143 A1    Oct. 24, 2024

Related U.S. Application Data

(60) Provisional application No. 63/460,877, filed on Apr. 20, 2023.

(51) Int. Cl.
*H04N 19/44* (2014.01)
*H04N 19/13* (2014.01)
*H04N 19/176* (2014.01)

(52) U.S. Cl.
CPC ............. *H04N 19/44* (2014.11); *H04N 19/13* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 11,418,785 | B2 * | 8/2022 | Nguyen | H04N 19/132 |
| 12,143,637 | B2 * | 11/2024 | Leleannec | H04N 19/119 |
| 2021/0058642 | A1 * | 2/2021 | Egilmez | H04N 19/593 |

(Continued)

OTHER PUBLICATIONS

"Series H: Audiovisual and Multimedia Systems—Infrastructure of audiovisual services—Coding of moving video", High efficiency video coding, Telecommunication Standardization Sector of ITU, Rec. ITU-T H.265, Apr. 2013, 317 pages.

(Continued)

*Primary Examiner* — Talha M Nawaz
(74) *Attorney, Agent, or Firm* — ARENTFOX SCHIFF LLP

(57) ABSTRACT

A video bitstream including a current transform block (TB) in a current picture is received. A context model is determined for a syntax element associated with a transform coefficient level of a first coefficient group (CG) in the current TB based on transform coefficient levels of at least one first neighboring CG of the first CG. The first CG is positioned on a first scanning line. The at least one first neighboring CG is positioned on a second scanning line that is scanned before the first scanning line. The context model is a probability model for a non-separable transform. The first CG is reconstructed based on the transform coefficient level that is determined according to the determined the context model.

20 Claims, 12 Drawing Sheets

(56) References Cited

U.S. PATENT DOCUMENTS

| | | | |
|---|---|---|---|
| 2021/0084303 A1* | 3/2021 | Sarwer | H04N 19/157 |
| 2022/0086444 A1* | 3/2022 | Piao | H04N 19/12 |
| 2022/0295086 A1* | 9/2022 | Zhao | H04N 19/13 |
| 2022/0295099 A1* | 9/2022 | Zhang | H04N 19/11 |
| 2024/0015326 A1* | 1/2024 | Ray | H04N 19/105 |
| 2024/0073432 A1* | 2/2024 | Rosewarne | H04N 19/159 |

OTHER PUBLICATIONS

"Series H: Audiovisual and Multimedia Systems—Infrastructure of audiovisual services—Coding of moving video", High efficiency video coding, Telecommunication Standardization Sector of ITU, Rec. ITU-T H.265-v2, Oct. 2014, 540 pages.

"Series H: Audiovisual and Multimedia Systems—Infrastructure of audiovisual services—Coding of moving video", High efficiency video coding, Telecommunication Standardization Sector Of ITU, Rec. ITU-T H.265-v3, Apr. 2015, 634 pages.

"Series H: Audiovisual and Multimedia Systems—Infrastructure of audiovisual services—Coding of moving video", High efficiency video coding, Telecommunication Standardization Sector of ITU, Rec. ITU-T H.265-v4, Dec. 2016, 664 pages.

International Search Report and Written Opinion received for PCT Patent Application No. PCT/US2024/025238, mailed on Jul. 25, 2024, 9 pages.

Nikitin et al., "AHG12: Context modeling for transform coefficients for LFNST/NSPT", Joint Video Experts Team (JVET) of ITU-T SG 16 WP 3 and ISO/IEC JTC 1/SC 29, 30th Meeting, Antalya, TR, Apr. 21-28, 2023, Document: JVET-AD0204-v3, Date Saved: Oct. 17, 2024, pp. 1-2.

\* cited by examiner

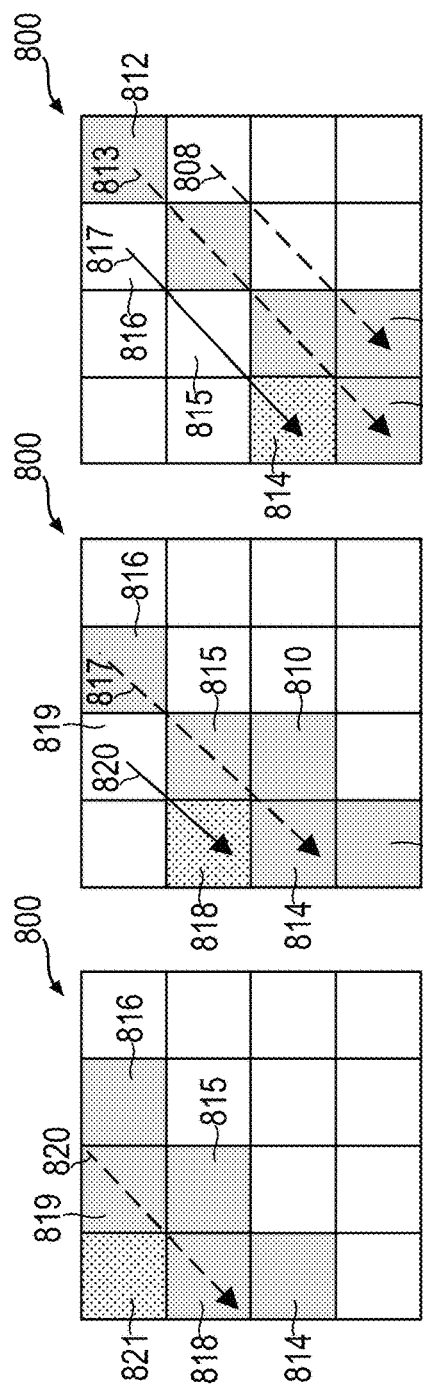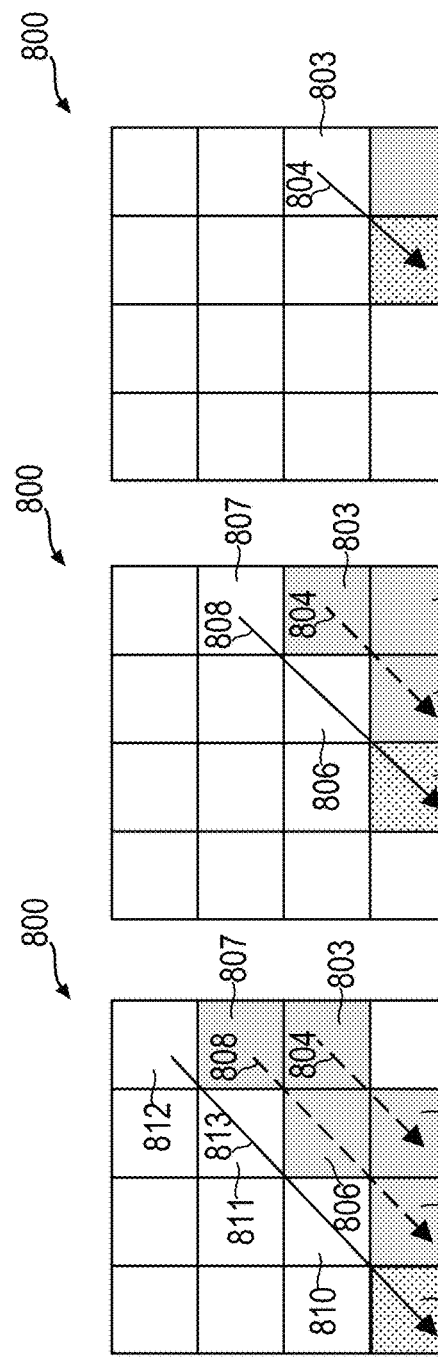

CONTEXT DERIVATION FOR ARITHMETIC CODING OF TRANSFORM COEFFICIENTS GENERATED BY NON-SEPARABLE TRANSFORMS

INCORPORATION BY REFERENCE

The present application claims the benefit of priority to U.S. Provisional Application No. 63/460,877, "Context Derivation for Arithmetic Coding of Transform Coefficients Generated by Non-Separable Transforms" filed on Apr. 20, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry.

According to an aspect of the disclosure, a method of video decoding performed in a video decoder is provided. In the method, a video bitstream including a current transform block (TB) in a current picture is received. A context model is determined for a syntax element associated with a transform coefficient level of a first coefficient group (CG) in the current TB based on transform coefficient levels of at least one first neighboring CG of the first CG. The first CG is positioned on a first scanning line. The at least one first neighboring CG is positioned on a second scanning line that is scanned before the first scanning line. The context model is a probability model for a non-separable transform. The first CG is reconstructed based on the transform coefficient level that is determined according to the determined the context model.

In an example, the at least one first neighboring CG includes a first neighboring CG positioned on the second scanning line and another first neighboring CG positioned on a third scanning line that is scanned before the first scanning line and the second scanning line.

In an example, the at least one first neighboring CG is positioned further than the first CG from a top-left sample position of the current TB.

In an example, the first scanning line and the second scanning line are parallel diagonal lines.

In an example, a number of the at least one first neighboring CG is determined based on a position of the first CG in the current TB.

In an example, a number of the at least one first neighboring CG is in a range from 1 to 15.

In an example, the syntax element is associated with an absolute value of the transform coefficient level of the first CG.

In an aspect, the non-separable transform is one of a low-frequency non-separable transform (LFNST) mode and a non-separable primary transforms (NSPT) mode.

In an example, based on the transform coefficient levels of the at least one first neighboring CG of the first CG, a context model for a syntax element associated with a transform coefficient level for each of a plurality of CGs positioned on the first scanning line is determined.

In an example, a context model is determined for a syntax element associated with a transform coefficient level of a second CG on the first scanning line based on transform coefficient levels of at least one second neighboring CG of the second CG. The at least one second neighboring CG includes a second neighboring CG positioned on the second scanning line and another second neighboring CG that is different from the at least one first neighboring CG.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIGS. 8A, 8B, 8C, 8D, 8E, and 8F show an exemplary process of selecting probability models based on a scanning line.

DETAILED DESCRIPTION OF EMBODIMENTS

Figure 1:
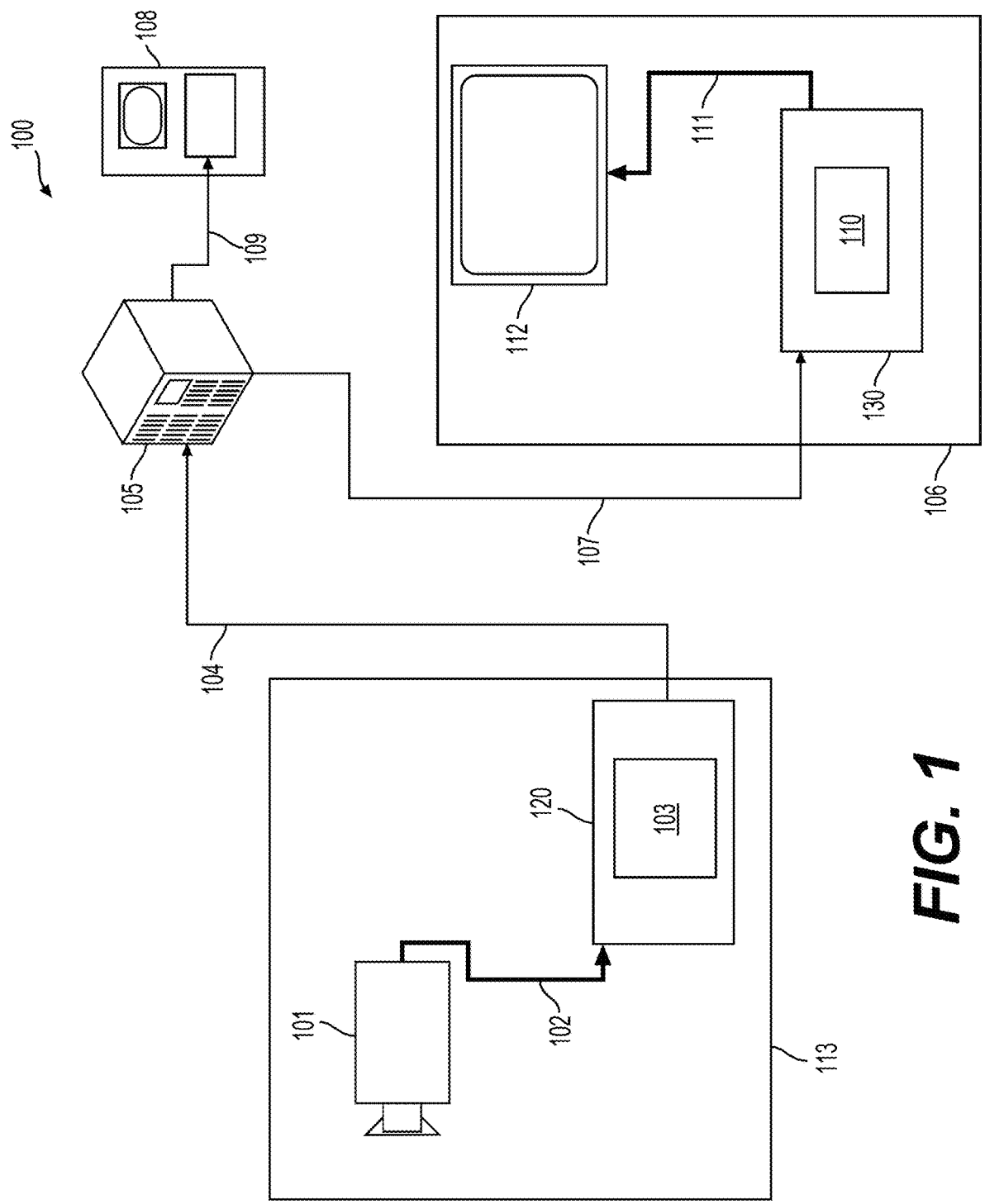
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
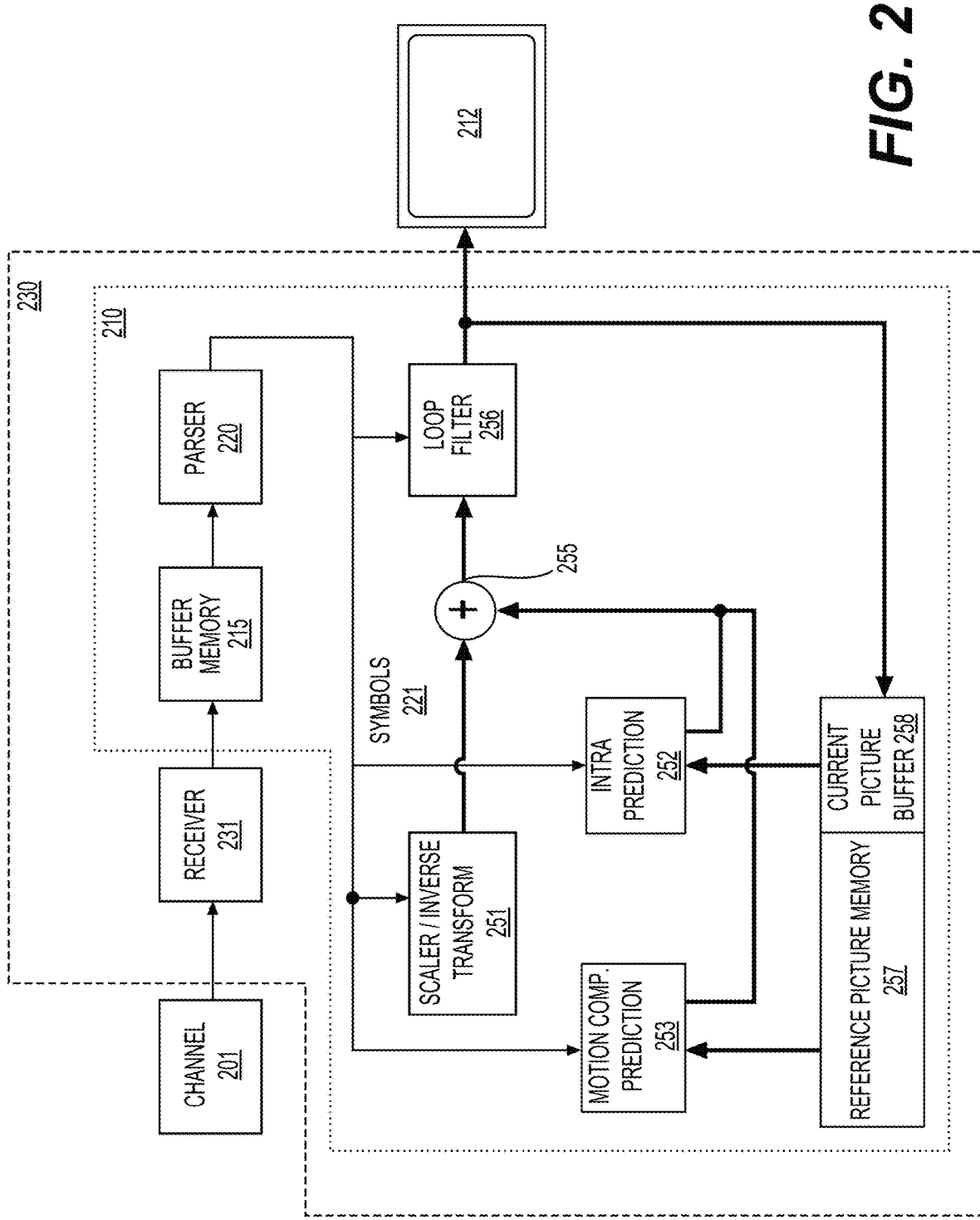
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
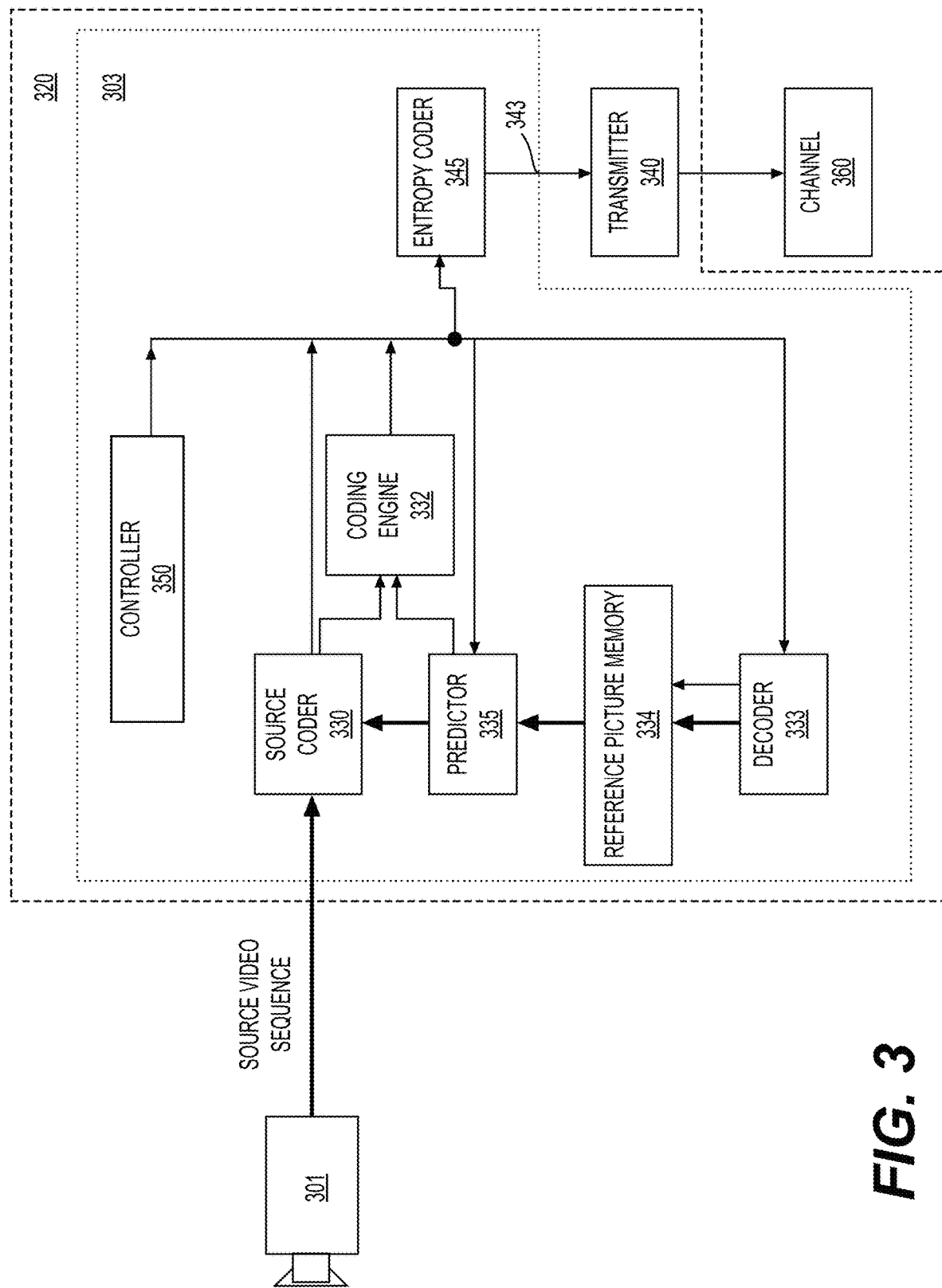
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

This disclosure includes aspects related to context derivation for arithmetic coding of transform coefficients generated by non-separable transforms. For example, a context model for a syntax element associated with a transform coefficient level of a coefficient group (CG) in a transform block (TB) can be derived based on at least one neighboring CG of the CG. The at least one neighboring CG is not positioned in a scanning line (e.g., a diagonal scanning line) in which the CG positioned on.

Figure 4:
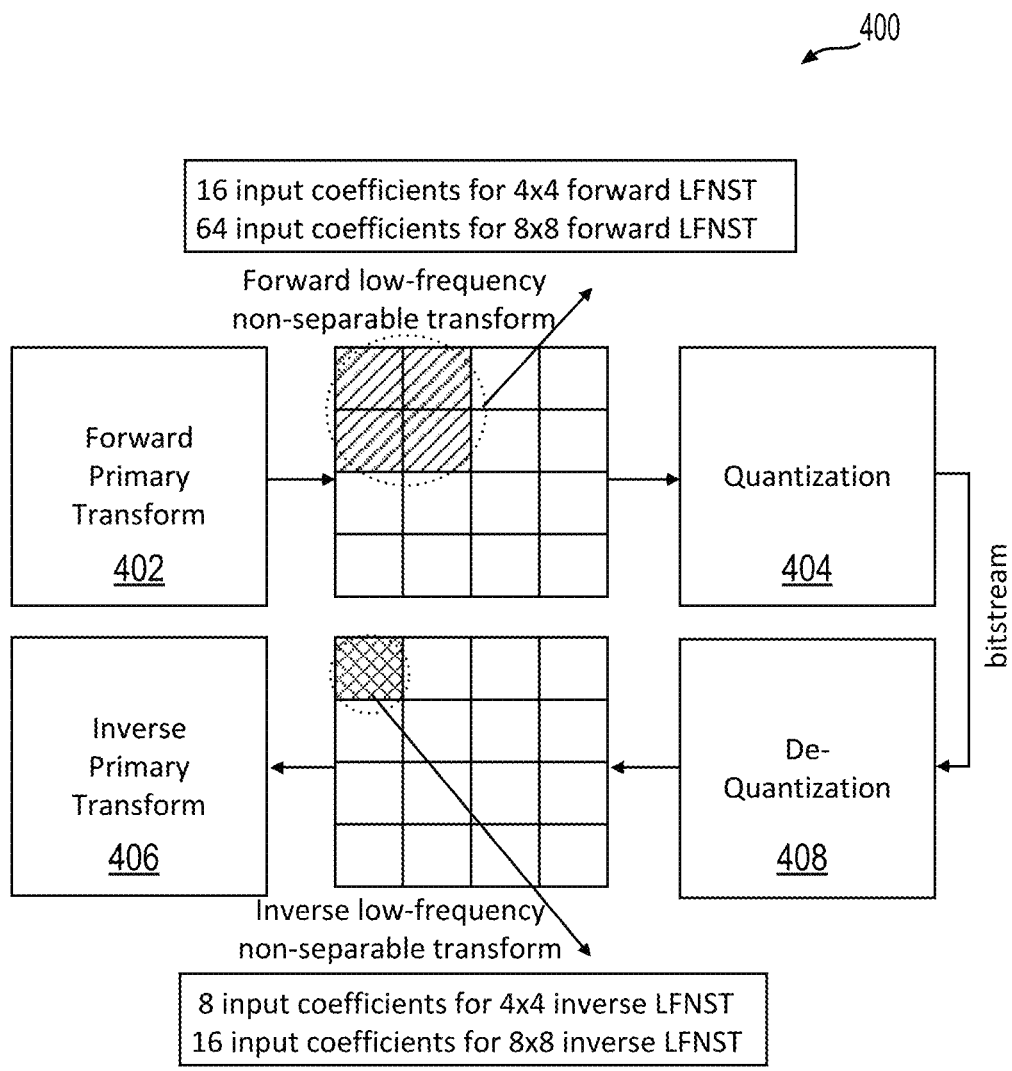
FIG. 4 is a schematic illustration of a low-frequency non-separable transform (LFNST).

Low-frequency non-separable transform (LFNST) can be applied between a forward primary transform and a quantization (at an encoder) and between a de-quantization and an inverse primary transform (at a decoder side), which can be shown in FIG. 4. For example, as shown in FIG. 4, a LFNST (400) can be applied as a forward LFNST between a forward primary transform (402) and a quantization (404), and an inverse LFNST between an inverse primary transform (406) and a de-quantization (408). In LFNST, 4×4 non-separable transform or 8×8 non-separable transform can be applied according to a block size. For example, 4×4

LFNST can be applied for small blocks (e.g., min (width, height)<8) and 8×8 LFNST can be applied for larger blocks (e.g., min (width, height)>4).

Application of a non-separable transform, such as LFNST, can be described as follows using an input as an example. To apply 4×4 LFNST, a 4×4 input block X can be provided in equation (1), for example.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{Eq. (1)}$$

The input block X can then be represented as a vector $\vec{X}$ as shown in equation (2).

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T \quad \text{Eq. (2)}$$

The non-separable transform can be calculated as $\vec{F} = T\vec{X}$, where $\vec{F}$ indicates the transform coefficient vector, and T is a 16×16 transform matrix. The 16×1 coefficient vector $\vec{F}$ can subsequently be re-organized as a 4×4 block using a scanning order (e.g., a horizontal, a vertical or a diagonal scanning) for that block. The coefficients with a smaller index can be placed with a smaller scanning index in the 4×4 coefficient block.

Figure 5:
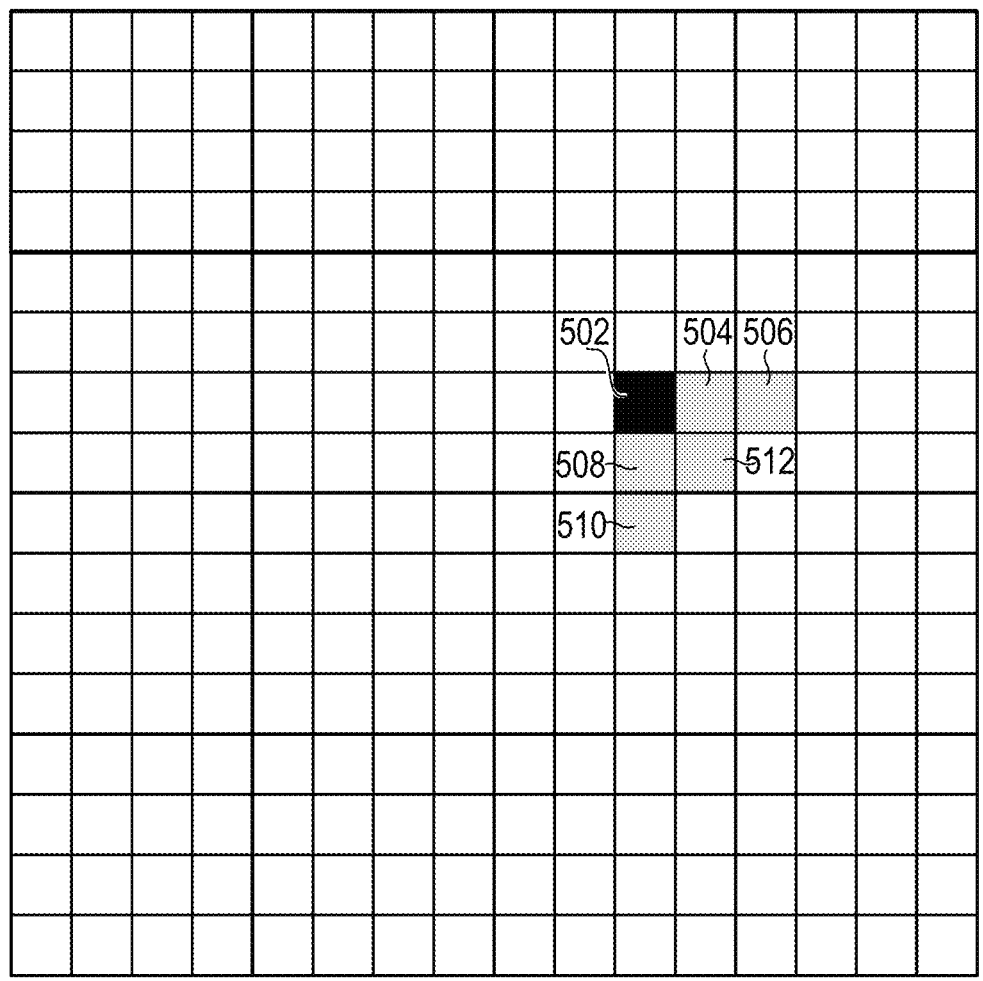
FIG. 5 is an exemplary template used for selecting a context model for coefficient coding.

In context modeling for coefficient coding, selection of probability models for syntax elements related to absolute values of transform coefficient levels can depend on values of the absolute levels (or absolute values of the transform coefficient levels) or partially reconstructed absolute levels in a local neighborhood. The template used for the context modeling can be illustrated in FIG. 5. As shown in FIG. 5, a probability model (e.g., a context model) for coding a syntax element associated with a transform coefficient level of a current scan position (or a current CG) (502) can be derived based on absolute values of transform coefficient levels of neighboring positions (or neighboring CGs), such as neighboring CGs (504), (506), (508), (510), and (512).

Figure 6:
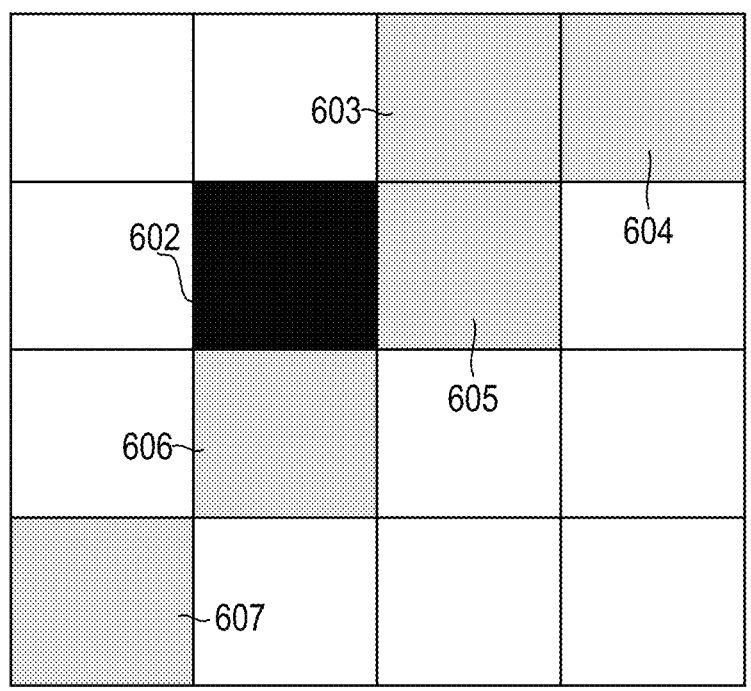
FIG. 6 is an exemplary template used for selecting a context model for coding coefficients.

In a modification of context modelling, as shown in FIG. 6, coding efficiency can be improved by using a previous 5 coefficients (e.g., coefficients of previous 5 scanned positions) (603)-(607) in a coding order instead of the template shown in FIG. 5 to model the contexts for syntax elements related to absolute values of the transform coefficient level (or quantized transform coefficients) of a current scan position (602).

Figure 7:
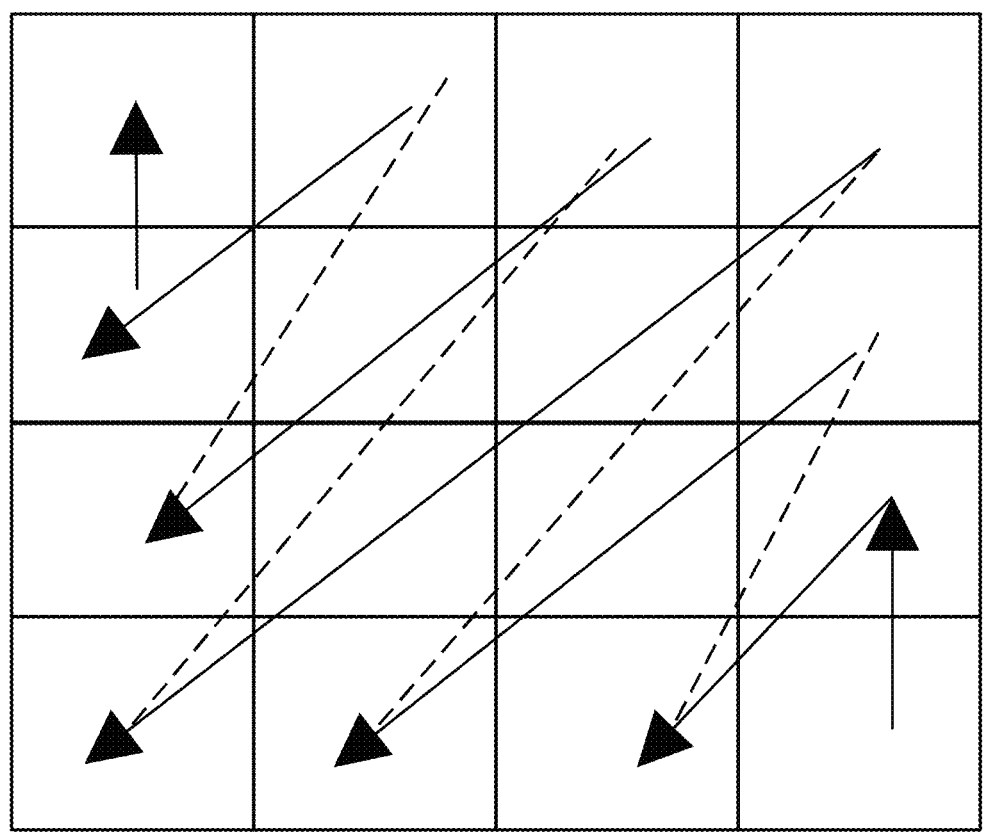
FIG. 7 is a schematic illustration of a reverse diagonal scan.

The syntax elements related to absolute values of transform coefficient levels can be parsed in a reverse diagonal scan order as shown in FIG. 7. If a template illustrated in FIG. 5 is used for context modelling, all syntax elements related to absolute transform coefficient levels along a same diagonal line can be parsed parallelly, thus increasing throughput. But with the template proposed in FIG. 6, the parallelization (or parallel parsing) may not be possible. Thus, a more efficient context modelling may be required to capture the coding efficiency without disrupting parallel parsing.

In the disclosure, a context modelling is provided. In the provided context modelling, previous N transform coefficients (or transform coefficients of previous N CGs) in a coding order (or a scanning line) can be applied to model contexts for syntax elements related to absolute values of transform coefficient levels of a current CG. The previous N transform coefficients does not belong to a same diagonal scanning line in which a current CG is positioned on. The provided context modelling can improve coding efficiency without disrupting a parallel parsing.

In an aspect, the previous N transform coefficients in the coding order, that do not belong in the same diagonal scanning line, can be used to model the contexts for syntax elements related to absolute values of transform coefficient levels.

In an embodiment, a current block (or a TB) in a current picture can be partitioned into a plurality of CGs. Each CG can include a plurality of samples, such as 4×4 samples. To code the current block, a coding order, such as a reverse diagonal scan shown in FIG. 7 can be applied. To code a first CG in a first scanning line of the coding order, transform coefficients of N neighboring CGs of the first CG can be applied to derive a context model for syntax elements (e.g., sb_coded_flag) associated with absolute values of transform coefficient levels (or quantized transform coefficients) of the first CG. The N neighboring CGs can be positioned on one or more scanning lines different from the first scanning line of the coding order.

In an aspect, for a coefficient group (CG) with 16 samples, the templates used for selecting probability models for LFNST/NSPT is scanning line dependent as illustrated but not limited to in FIGS. 8A, 8B, 8C, 8D, 8E, and 8F.

In an embodiment, a coding order, such as a reverse diagonal scan, can be applied to a transform block (TB) (800) that is shown in FIGS. 8A, 8B, 8C, 8D, 8E, and 8F. The TB (800) can be partitioned into a plurality of CGs, such as 16 CGs shown in FIG. 8A. Each of the CGs can include a plurality of samples, such as 16 samples. According to the reverse diagonal scan, as shown in FIG. 8F, a CG (801) positioned at a lower right corner of the TB (800) can be coded at first. For example, transform coefficient levels of the CG (801) can be entropy coded. According to the reverse diagonal scan, CGs (802) and (803) positioned in a scanning line, such as a diagonal scanning line (804), can further be coded. In an example, context models for syntax elements, such as sb_coded_flag, related to absolute values of transform coefficient levels (or quantized transform coefficients) of a current scan position, such as the CG (802) or the CG (803), can be derived based on the transform coefficient levels of the CG (801).

The coding process can proceed to FIG. 8E. As shown in FIG. 8E, according to the coding order, CGs (805)-(807) in a scanning line (or a first scanning line) (808) can be coded. In an example, context models for syntax elements related to absolute values of transform coefficient levels of a current scan position (or current CG), such as one of the CGs (805)-(807) in the first scanning line (808), can be derived based on the transform coefficient levels of neighboring CGs of the current CG, such as CGs (801)-(803). Still referring to FIG. 8E, the neighboring CGs can include CGs (e.g., (802)-(803)) that are positioned in a scanning line (or second scanning line) (804) that is scanned before and different from the scanning line (e.g., (808)) in which the current CG (e.g., (805)) is positioned one. In an example, the first scanning line (808) and the second scanning line (804) can be parallel to a diagonal of the TB (800). In an example, the neighboring CGs, such as CGs (801)-(803), can be positioned further than the current CG, such as CG (805), with respect to a top-left sample position of the TB (800).

The coding process can proceed to FIG. 8D. As shown in FIG. 8D, according to the coding order, CGs (809)-(812) in a scanning line (or a first scanning line) (813) can be coded. In an example, context models for syntax elements related to absolute values of transform coefficient levels of a current scan position (or current CG or a first CG), such as one of the CGs (809)-(812), can be derived based on the transform coefficient levels of neighboring CGs (or first neighboring CGs) of the current CG, such as CGs (802)-(803) and (805)-(807). Still referring to FIG. 8D, the neighboring CGs can be positioned in one or more scanning lines, such as in a second scanning line (804) and a third scanning line (808), that are scanned before and different from the first scanning line (813) in which the current CG (e.g., (809)) is positioned on. In an example, the scanning lines (804), (808), and (813) can be parallel to the diagonal of the TB (800).

Referring to FIG. 8C, each of CGs (814)-(816) along a scanning line (817) can be coded based on neighboring CGs (809)-(812) and (805), for example. In FIG. 8B, each of CGs (818)-(819) along a scanning line (820) can be coded based on neighboring CGs (809)-(810) and (814)-(816), for example. In FIG. 8A, a current scan position (or current CG) (821) can be coded based on neighboring CGs (814)-(816) and (818)-(819), for example. Thus, as shown in FIGS. 8A, 8B, 8C, 8D, 8E, and 8F, each CG in a current scanning line can be coded based on a same group of neighboring CGs that is positioned on one or more scanning lines different from the current scanning line.

In an aspect, for a coefficient group (CG) with 16 samples, the templates used for selecting probability models for LFNST/NSPT is scanning line and position (in scanning line) dependent. An example can be illustrated in FIGS. 9A, 9B, and 9C.

Figures 9A, 9B, 9C:
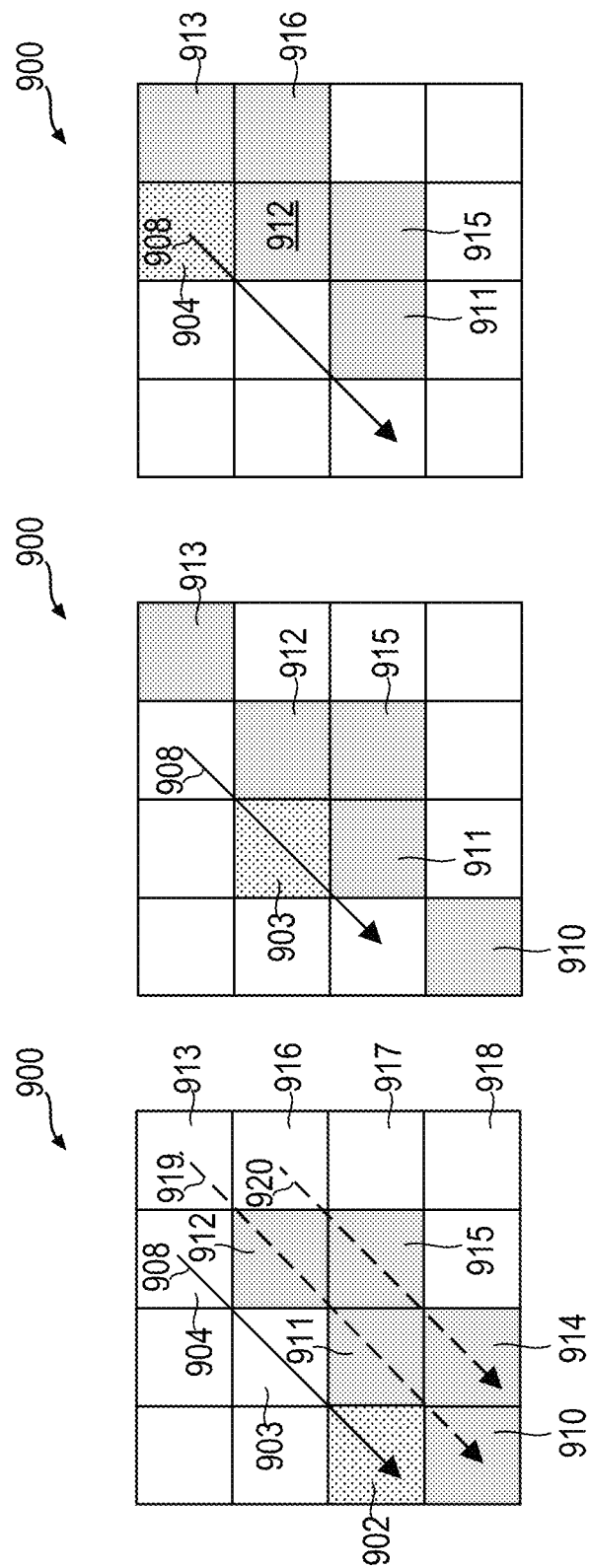
FIGS. 9A, 9B, and 9C show an exemplary process of selecting probability models based on a position in a scanning line.

In an embodiment, as shown in FIG. 9A, a TB (900) can include a plurality of CGs, such as CGs (902)-(904) positioned in a scanning line (908). When the CG (902) is a current scan position (or a first CG), context models for syntax elements related to absolute values of transform coefficient levels of the current scan position (or current CG) (902) can be derived based on transform coefficient levels of neighboring CGs (or at least one first neighboring CG) of the current CG, such as CGs (910)-(912) in a scanning line (919) and CGs (914)-(915) in a scanning line (920). When the CG (903) is a current scan position (or a second CG), context models for syntax elements related to absolute values of transform coefficient levels of the current scan position (or current CG) (903) can be derived based on the transform coefficient levels of neighboring CGs (or at least one second neighboring CG) of the current CG, such as CGs (910)-(913) in the scanning line (919) and the CG (915) in the scanning line (920). When the CG (904) is a current scan position, context models for syntax elements related to absolute values of transform coefficient levels of the current scan position (or current CG) (904) can be derived based on the transform coefficient levels of neighboring CGs of the current CG, such as CGs (911)-(913) in the scanning line (919) and CGs (915)-(916) in the scanning line (920). Thus, each CG in a same scanning line can be coded based on a different group of neighboring CGs, which depends on a position of the current scan position in the scanning line. In some embodiments, a first CG (e.g., (902)) and a second CG (e.g., (903)) in a same scanning line (e.g., (908)) can be coded based on one or more same neighboring CGs (e.g., (911) and (912)). In some embodiments, the group of neighboring CGs for a first CG (e.g., (902)) can include a least one CG (e.g., (914)) that is not included in the group of neighboring CGs for a second CG (e.g., (903)).

In an aspect, the value of N is position dependent. It depends on the position (x, y) of the transform coefficient currently parsed. Here (x, y) corresponds to Euclidean coordinates of the coefficient with respect to the top-left sample position.

In an example, as shown in FIGS. 8D, 8E, and 8F, the CGs (802)-(803) can be coded based on one neighboring CG (801), the CGs (805)-(807) can be coded based on 3 neighboring CGs (801)-(803), and CGs (809)-(812) can be coded based on 5 neighboring CGs (805)-(808) and CGs (802)-(803). The CGs (802)-(803) can be positioned further than the CGs (805)-(807) with respect to a top-left sample position of the TB (800). The CGs (805)-(807) can be positioned further than the CGs (809)-(812) with respect to the top-left sample position of the TB (800).

In an aspect, the value of N can include, but is not limited to, the elements of set {1, 2, 3, 4, 5, . . . 15}.

For example, the CGs (802)-(803) can be coded based on one neighboring CG, such as the CG (801). The CGs (805)-(807) can be coded based on 3 neighboring CGs, such as CGs (801)-(803). The CGs (809)-(812) can be coded based on 5 neighboring CGs, such as CGs (805)-(808) and CGs (802)-(803).

Figure 10:
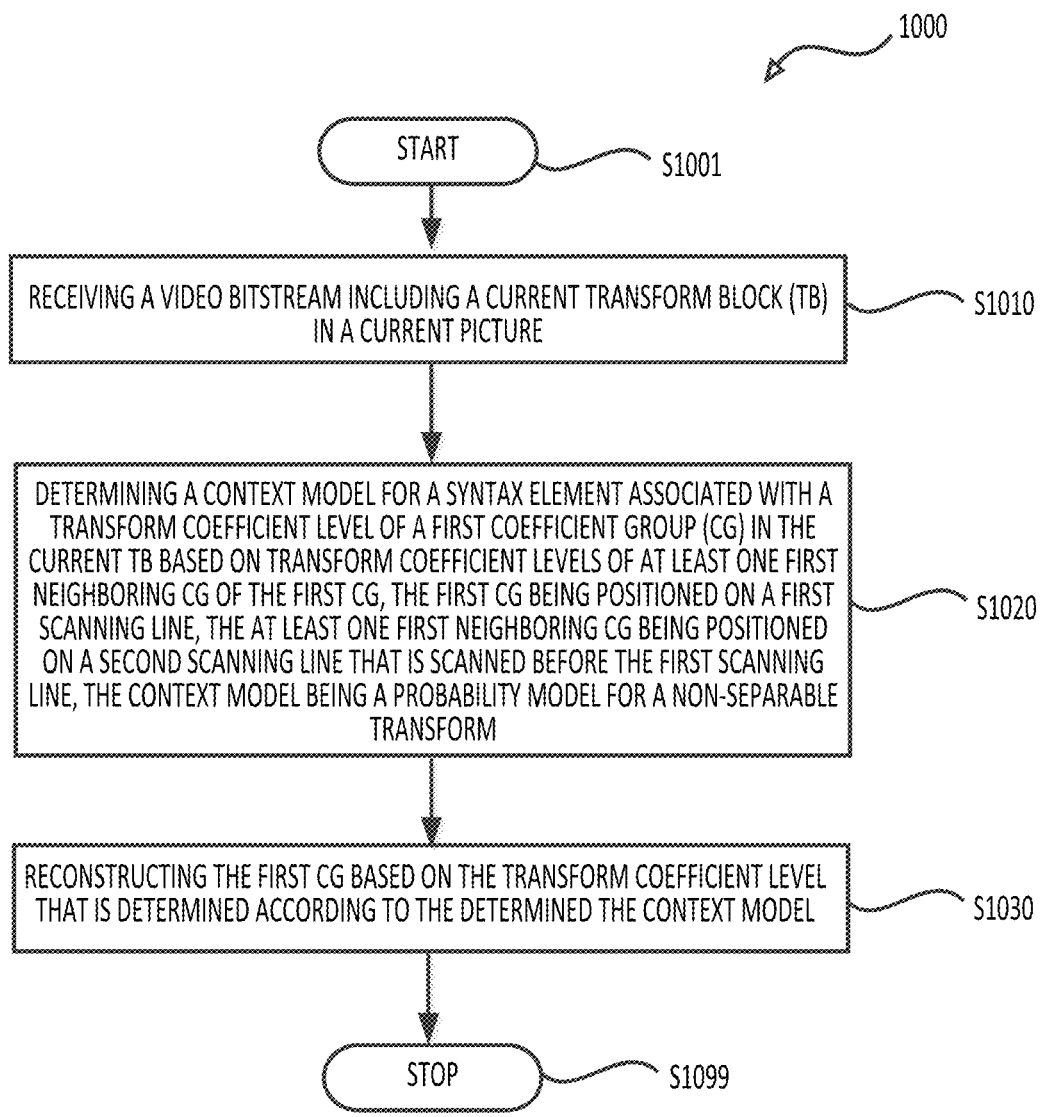
FIG. 10 shows a flow chart outlining a decoding process according to some embodiments of the disclosure.

FIG. 10 shows a flow chart outlining a process (1000) according to an embodiment of the disclosure. The process (1000) can be used in a video decoder. In various embodiments, the process (1000) is executed by processing circuitry, such as the processing circuitry that performs functions of the video decoder (110), the processing circuitry that performs functions of the video decoder (210), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a video bitstream including a current transform block (TB) in a current picture is received.

At (S1020), a context model is determined for a syntax element associated with a transform coefficient level of a first coefficient group (CG) in the current TB based on transform coefficient levels of at least one first neighboring CG of the first CG. The first CG is positioned on a first scanning line. The at least one first neighboring CG is positioned on a second scanning line that is scanned before the first scanning line. The context model is a probability model for a non-separable transform.

In an aspect, the previous N transform coefficients can be applied in the coding order, that do not belong in the same diagonal scanning line, to model the contexts for syntax elements related to absolute values of transform coefficient levels. In an example, As shown in FIGS. 8A, 8B, 8C, 8D, 8E, and 8F, the templates used for selecting probability models for LFNST/NSPT is scanning line dependent. In an example, for a coefficient group (CG) with 16 samples, the templates used for selecting probability models for LFNST/NSPT is scanning line and position (in scanning line) dependent. An example can be illustrated in FIGS. 9A, 9B, and 9C.

At (S1030), the first CG is reconstructed based on the transform coefficient level that is determined according to the determined the context model.

In an example, the at least one first neighboring CG includes a first neighboring CG positioned on the second scanning line and another first neighboring CG positioned on a third scanning line that is scanned before the first scanning line and the second scanning line.

In an example, the at least one first neighboring CG is positioned further than the first CG from a top-left sample position of the current TB.

In an example, the first scanning line and the second scanning line are parallel diagonal lines.

In an example, a number of the at least one first neighboring CG is determined based on a position of the first CG in the current TB.

In an example, a number of the at least one first neighboring CG is in a range from 1 to 15.

In an example, the syntax element is associated with an absolute value of the transform coefficient level of the first CG.

In an aspect, the non-separable transform is one of a low-frequency non-separable transform (LFNST) mode and a non-separable primary transforms (NSPT) mode.

In an example, based on the transform coefficient levels of the at least one first neighboring CG of the first CG, a context model for a syntax element associated with a transform coefficient level for each of a plurality of CGs positioned on the first scanning line is determined.

In an example, a context model is determined for a syntax element associated with a transform coefficient level of a second CG on the first scanning line based on transform coefficient levels of at least one second neighboring CG of the second CG. The at least one second neighboring CG includes a second neighboring CG positioned on the second scanning line and another second neighboring CG that is different from the at least one first neighboring CG.

Then, the process proceeds to (S1099) and terminates.

The process (1000) can be suitably adapted. Step(s) in the process (1000) can be modified and/or omitted. Additional step(s) can be added. Any suitable order of implementation can be used.

Figure 11:
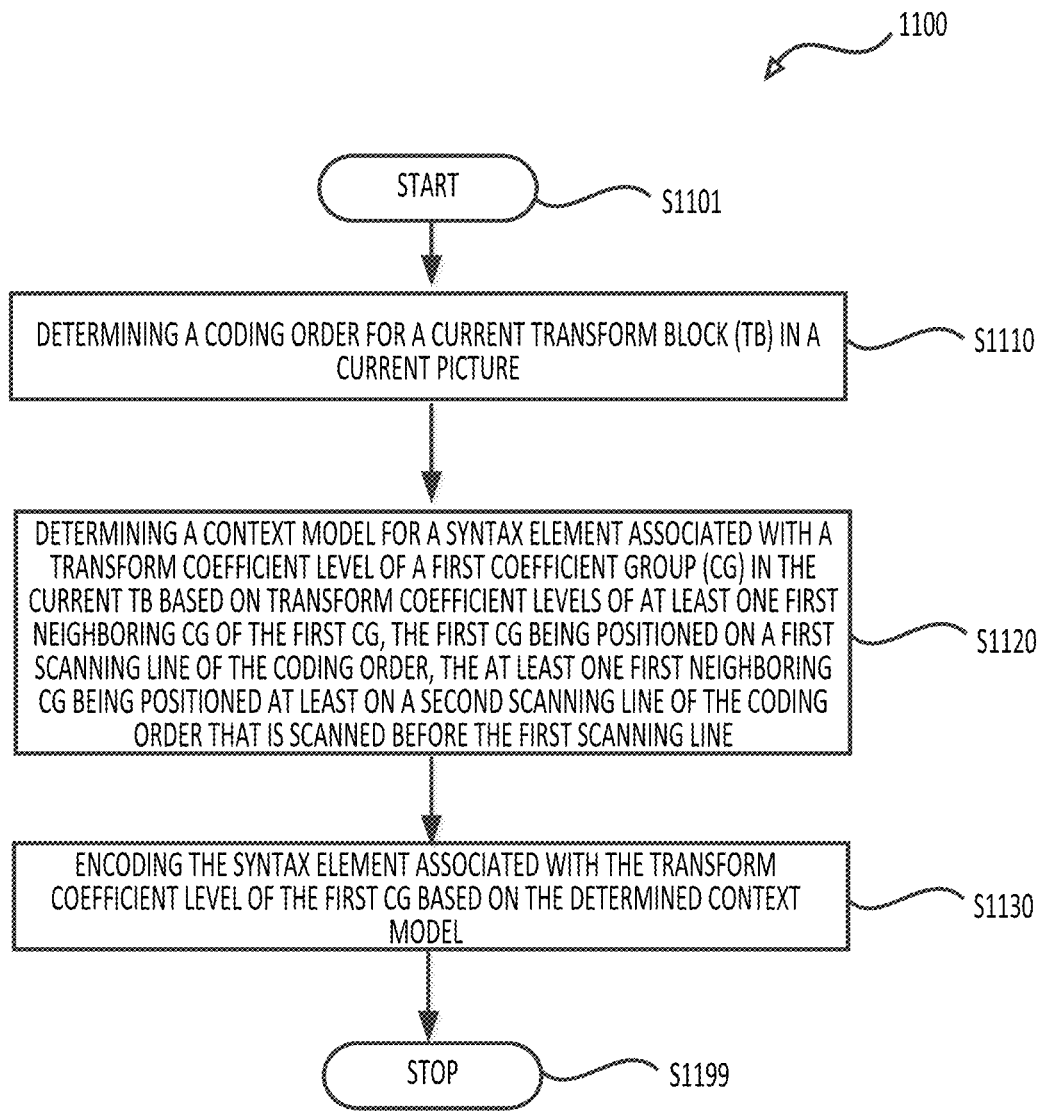
FIG. 11 shows a flow chart outlining an encoding process according to some embodiments of the disclosure.

FIG. 11 shows a flow chart outlining a process (1100) according to an embodiment of the disclosure. The process (1100) can be used in a video encoder. In various embodiments, the process (1100) is executed by processing circuitry, such as the processing circuitry that performs functions of the video encoder (103), the processing circuitry that performs functions of the video encoder (303), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a coding order for a current transform block (TB) in a current picture is determined.

At (S1120), a context model is determined for a syntax element associated with a transform coefficient level of a first CG in the current TB based on transform coefficient levels of at least one first neighboring CG of the first CG. The first CG is positioned on a first scanning line of the coding order. The at least one first neighboring CG is positioned at least on a second scanning line of the coding order that is scanned before the first scanning line.

In an aspect, the previous N transform coefficients in the coding order can be used, that do not belong in the same diagonal scanning line, to model the contexts for syntax elements related to absolute values of transform coefficient levels. In an example, as shown in FIGS. 8A, 8B, 8C, 8D, 8E, and 8F, the templates used for selecting probability models for LFNST/NSPT is scanning line dependent. In an example, for a coefficient group (CG) with 16 samples, the templates used for selecting probability models for LFNST/NSPT is scanning line and position (in scanning line) dependent. An example can be illustrated in FIGS. 9A, 9B, and 9C.

At (S1130), the syntax element associated with the transform coefficient level of the first CG is encoded based on the determined context model.

Then, the process proceeds to (S1199) and terminates.

The process (1100) can be suitably adapted. Step(s) in the process (1100) can be modified and/or omitted. Additional step(s) can be added. Any suitable order of implementation can be used.

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
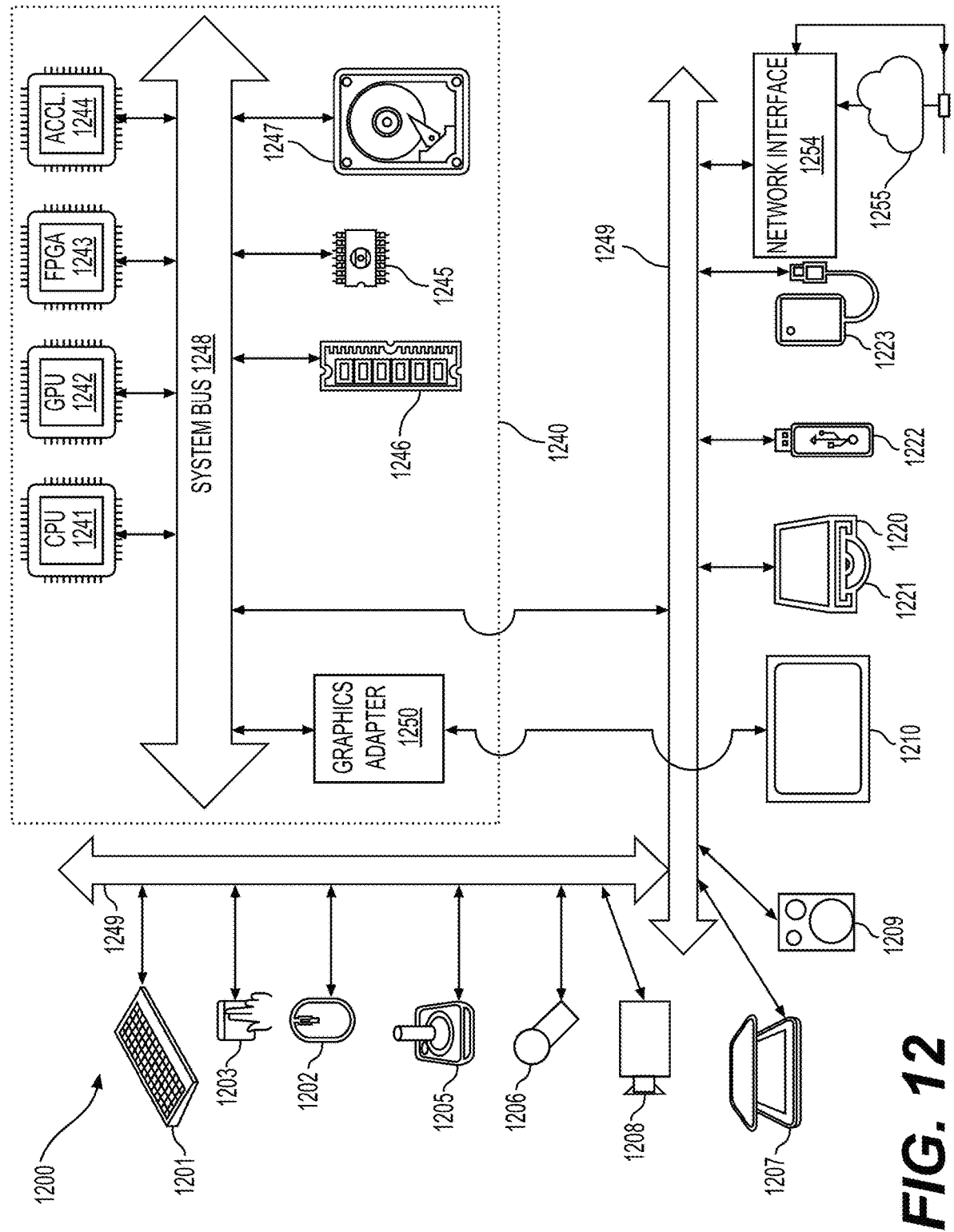
FIG. 12 is a schematic illustration of an exemplary computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface (1254) to one or more communication networks (1255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
   receiving a video bitstream including a current transform block (TB) in a current picture;
   determining a context model for a syntax element associated with a transform coefficient level of a first coefficient group (CG) in the current TB based on transform coefficient levels of at least one first neighboring CG of the first CG, the first CG being positioned on a first scanning line, the at least one first neighboring CG being positioned on a second scanning line that is scanned before the first scanning line, the context model being a probability model for a non-separable transform, each of a plurality of CGs in the first scanning line being coded according to a prediction mode based on a different group of closest neighboring CGs according to a position of the respective CG in the first scanning line; and
   reconstructing the first CG based on the transform coefficient level that is determined according to the determined the context model.

2. The method of claim 1, wherein the at least one first neighboring CG includes a first neighboring CG positioned on the second scanning line and another first neighboring CG positioned on a third scanning line that is scanned before the first scanning line and the second scanning line.

3. The method of claim 1, wherein the at least one first neighboring CG is positioned further than the first CG from a top-left sample position of the current TB.

4. The method of claim 1, wherein the first scanning line and the second scanning line are parallel diagonal lines.

5. The method of claim 1, wherein a number of the at least one first neighboring CG is determined based on a position of the first CG in the current TB.

6. The method of claim 1, wherein a number of the at least one first neighboring CG is in a range from 1 to 15.

7. The method of claim 1, wherein the syntax element is associated with an absolute value of the transform coefficient level of the first CG.

8. The method of claim 1, wherein the non-separable transform is one of a low-frequency non-separable transform (LFNST) mode and a non-separable primary transforms (NSPT) mode.

9. The method of claim 1, further comprising:
   determining a context model for a syntax element associated with a transform coefficient level for each of a plurality of CGs positioned on the first scanning line based on the transform coefficient levels of the at least one first neighboring CG of the first CG.

10. The method of claim 1, further comprising:
    determining a context model for a syntax element associated with a transform coefficient level of a second CG on the first scanning line based on transform coefficient levels of at least one second neighboring CG of the second CG, the at least one second neighboring CG including a second neighboring CG positioned on the second scanning line and another second neighboring CG that is different from the at least one first neighboring CG.

11. A method of video encoding, the method comprising:
    determining a context model for a syntax element associated with a transform coefficient level of a first coefficient group (CG) in a current transform block (TB) of a current picture based on transform coefficient levels of at least one first neighboring CG of the first CG, the first CG being positioned on a first scanning line, the at least one first neighboring CG being positioned on a second scanning line that is scanned before the first scanning line, the context model being a probability model for a non-separable transform, each of a plurality of CGs in the first scanning line being coded according to a prediction mode based on a different group of closest neighboring CGs according to a position of the respective CG in the first scanning line;
    encoding the first CG in a bitstream based on the transform coefficient level that is determined according to the determined the context model; and
    transmitting the encoded bitstream.

12. The method of claim 11, wherein the at least one first neighboring CG includes a first neighboring CG positioned on the second scanning line and another first neighboring CG positioned on a third scanning line that is scanned before the first scanning line and the second scanning line.

13. The method of claim 11, wherein the at least one first neighboring CG is positioned further than the first CG from a top-left sample position of the current TB.

14. The method of claim 11, wherein the first scanning line and the second scanning line are parallel diagonal lines.

15. The method of claim 11, wherein a number of the at least one first neighboring CG is determined based on a position of the first CG in the current TB.

16. The method of claim 11, wherein a number of the at least one first neighboring CG is in a range from 1 to 15.

17. The method of claim 11, wherein the syntax element is associated with an absolute value of the transform coefficient level of the first CG.

18. The method of claim 11, wherein the non-separable transform is one of a low-frequency non-separable transform (LFNST) mode and a non-separable primary transforms (NSPT) mode.

19. The method of claim 11, further comprising:
    determining a context model for a syntax element associated with a transform coefficient level for each of a plurality of CGs positioned on the first scanning line based on the transform coefficient levels of the at least one first neighboring CG of the first CG.

20. A non-transitory computer-readable storage medium storing instructions which when executed by a processor cause the processor to perform an encoding method comprising:
    determining a context model for a syntax element associated with a transform coefficient level of a first coefficient group (CG) in a current transform block (TB) of a current picture based on transform coefficient levels of at least one first neighboring CG of the first CG, the first CG being positioned on a first scanning line, the at least one first neighboring CG being positioned on a second scanning line that is scanned before the first scanning line, the context model being a probability model for a non-separable transform, each of a plurality of CGs in the first scanning line being coded according to a prediction mode based on a different group of closest neighboring CGs according to a position of the respective CG in the first scanning line;

encoding the first CG in a bitstream based on the transform coefficient level that is determined according to the determined the context model; and transmitting the encoded bitstream.

* * * * *